May 4, 1948.
C. J. MALHIOT
2,440,866
PACKAGING APPARATUS HAVING PARALLEL ARTICLE AND CONTAINER CARRYING
CONVEYORS COMBINED WITH ARTICLE PUSHER COMPRISING
ROTATING SPIDER WITH PIVOTALLY MOUNTED ARMS
Filed Jan. 12, 1942
4 Sheets-Sheet 3
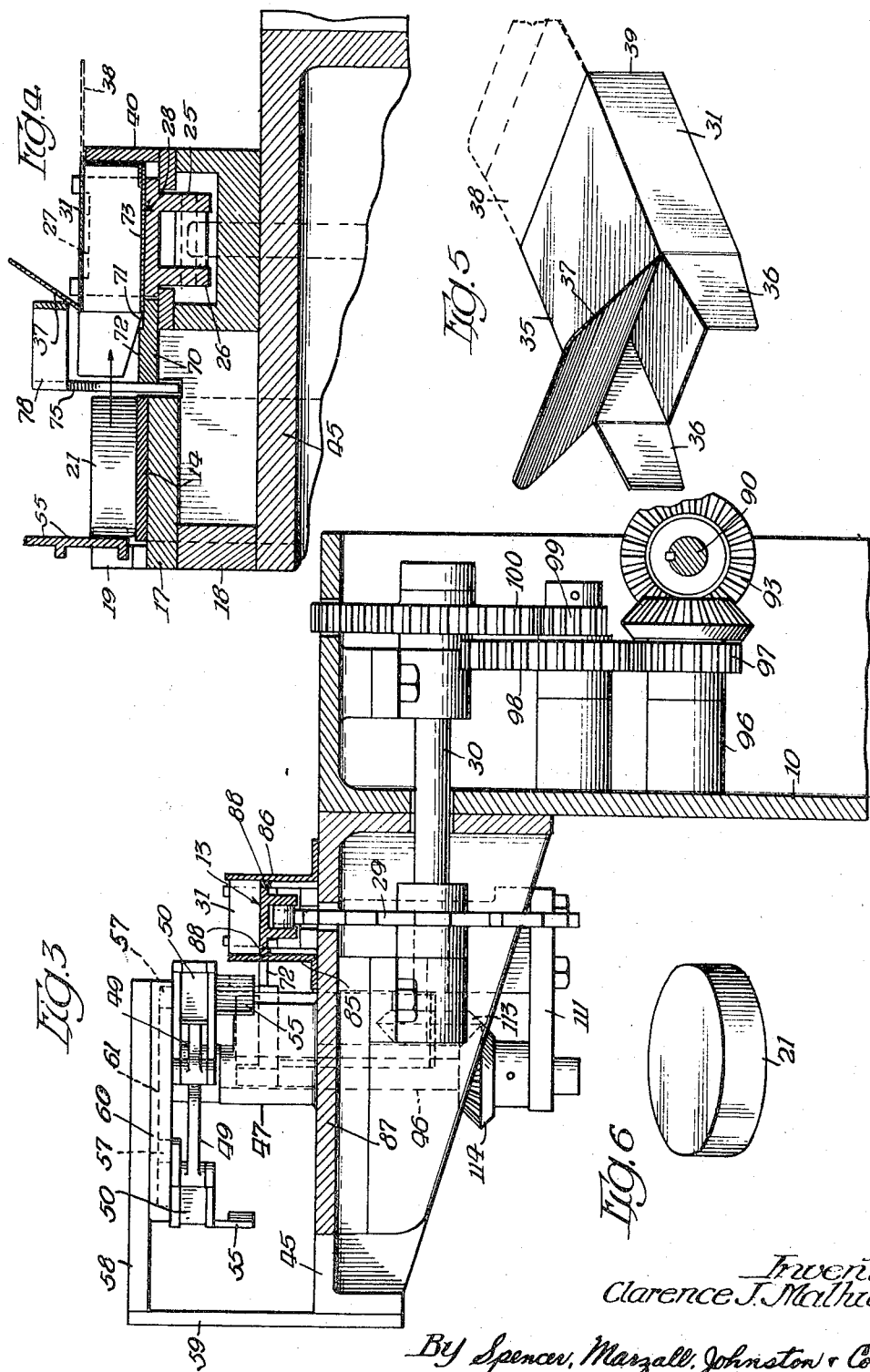
Inventor:
Clarence J. Malhiot
By Spencer, Marzall, Johnston & Cook
Attys May 4, 1948.  C. J. MALHIOT  2,440,866
PACKAGING APPARATUS HAVING PARALLEL ARTICLE AND CONTAINER CARRYING
CONVEYORS COMBINED WITH ARTICLE PUSHER COMPRISING
ROTATING SPIDER WITH PIVOTALLY MOUNTED ARMS
Filed Jan. 12, 1942  4 Sheets-Sheet 4
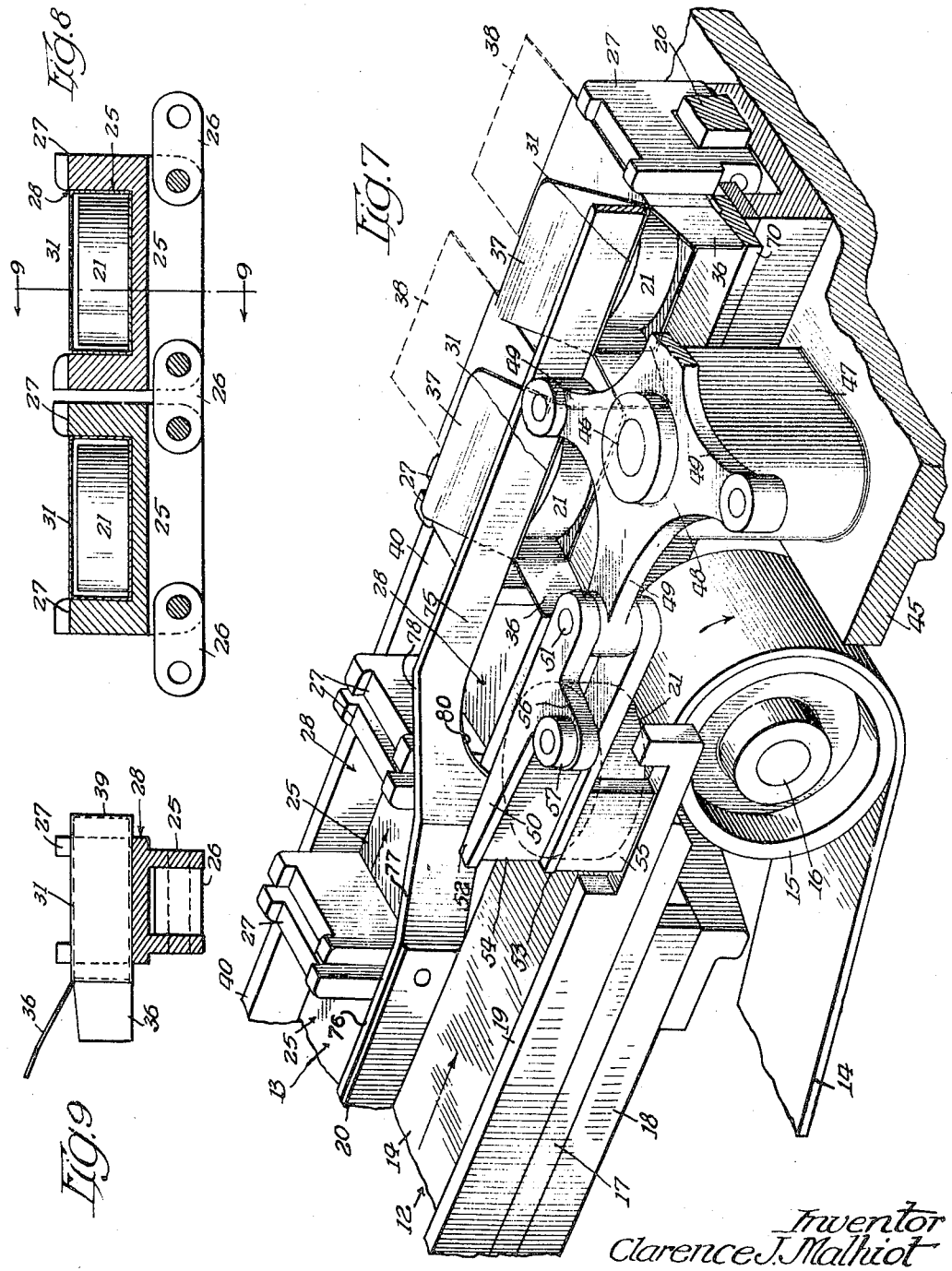
Inventor
Clarence J. Malhiot
By Spencer, Marzall, Johnston & Cook
Attys Patented May 4, 1948

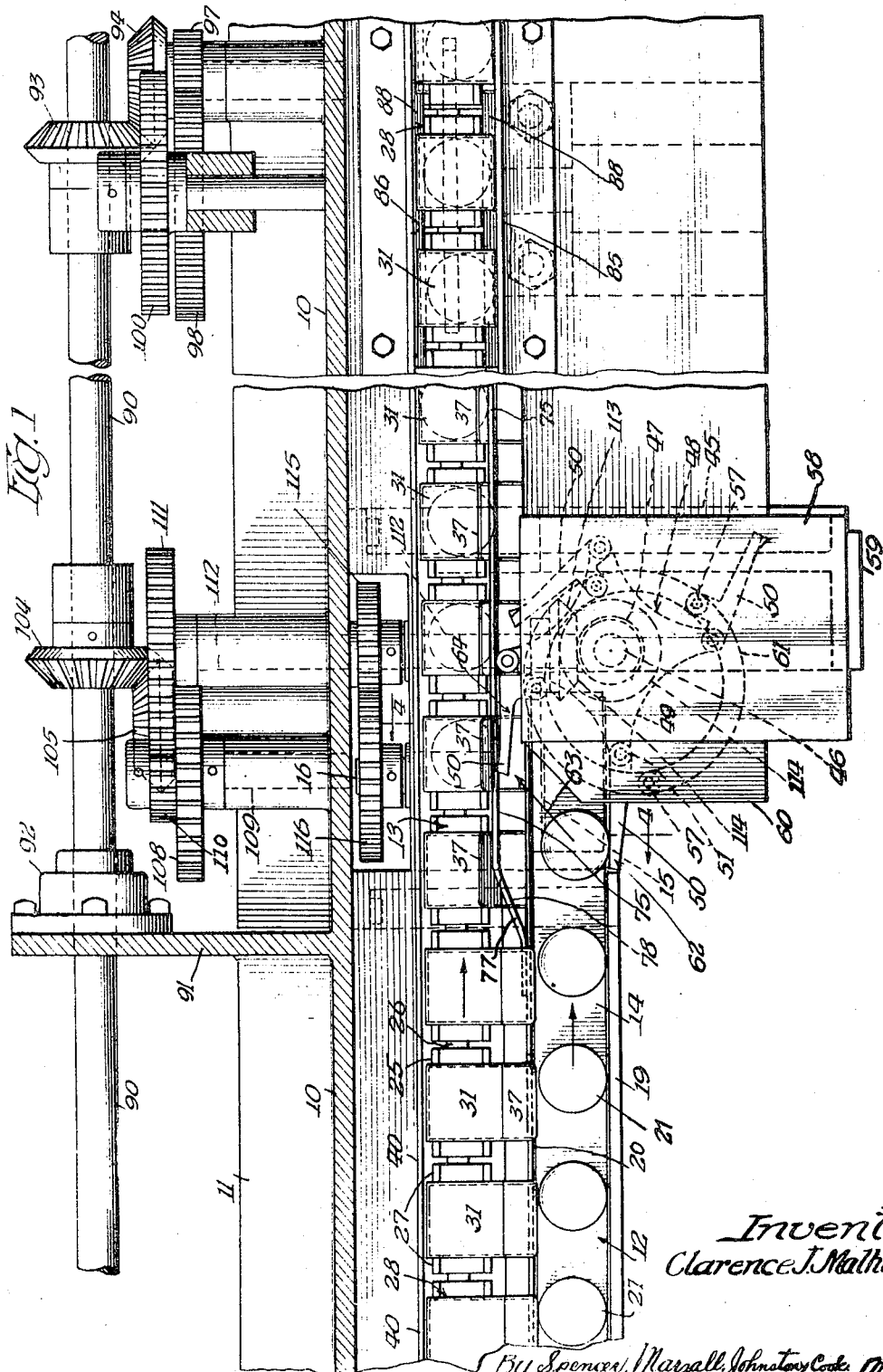

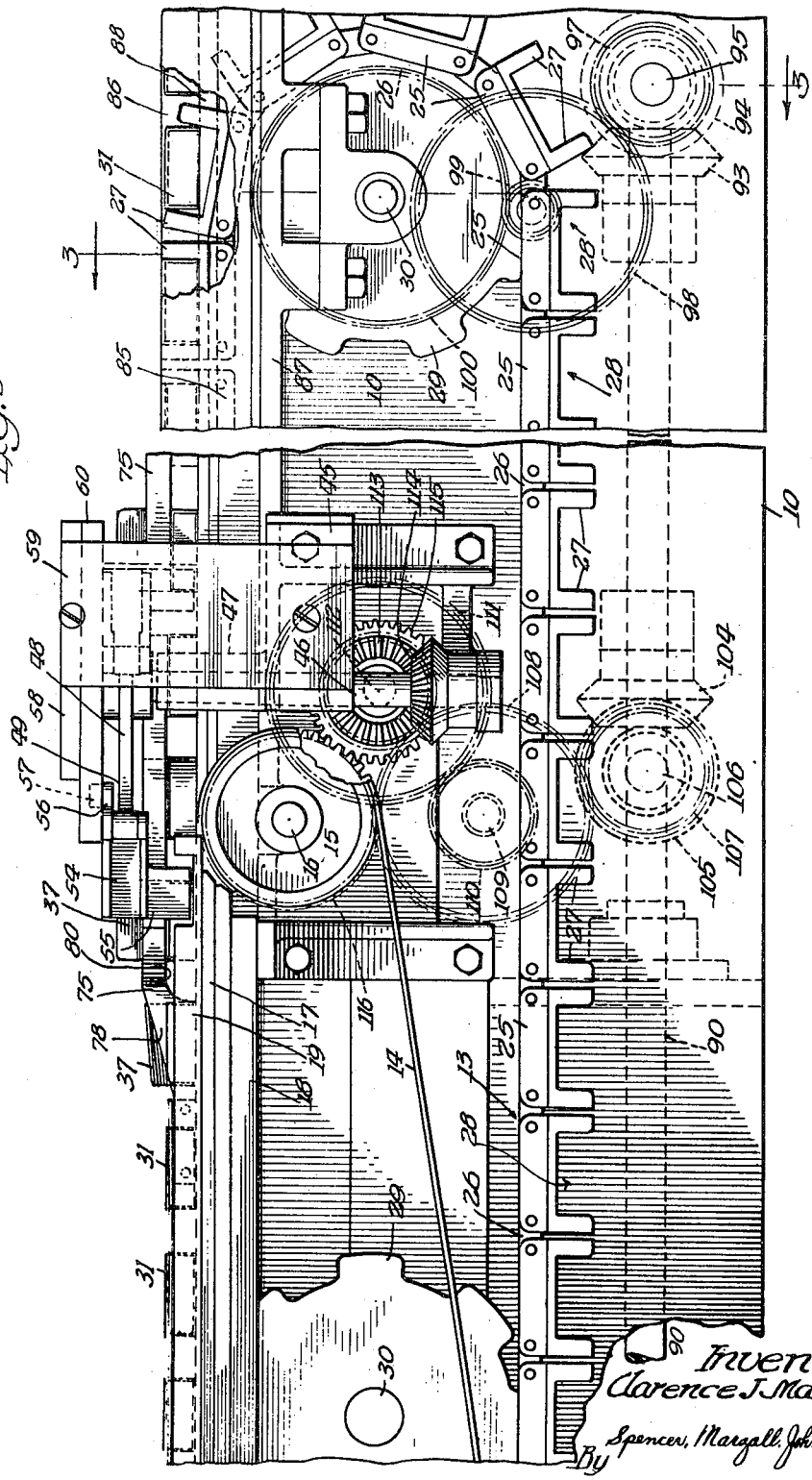

2,440,866

UNITED STATES PATENT OFFICE 2,440,866

PACKAGING APPARATUS HAVING PARALLEL ARTICLE AND CONTAINER CARRYING CONVEYORS COMBINED WITH ARTICLE PUSHER, COMPRISING ROTATING SPIDER WITH PIVOTALLY MOUNTED ARMS

Clarence J. Malhiot, Oak Park, Ill., assignor to F. B. Redington Co., Chicago, Ill., a corporation of Illinois Application January 12, 1942, Serial No. 426,373

1 Claim. (Cl. 226—2)

This invention relates to packaging apparatus and more particularly to apparatus for inserting articles into a packaging container.

The invention is illustrated in connection with a machine for feeding generally cylindrical articles, such as bars of soap, and for inserting the articles into a box made from cardboard or like material. The invention is capable of other uses, however, and may be used to feed any desired article into any desired type of container or package.

A primary object of the invention is the provision of automatic, continuously operated, high speed apparatus for feeding articles and inserting the articles into containers and the like.

A further object is the provision of simple and effective apparatus for continuously removing articles from a conveyor, transferring the articles to another conveyor, and inserting the articles into a container or the like carried by the second conveyor.

Another object is the provision of rotary apparatus for removing articles from a conveyor, transferring the articles to another conveyor, and inserting the articles into a container or the like carried by the second conveyor.

A further object is the provision of a relatively simple rotating device for removing articles from one longitudinally moving conveyor and inserting the articles into containers carried by a second longitudinally moving conveyor.

A further object is to provide for positively maintaining a closure flap of a container in open condition during insertion of an article within the container.

Another object is the provision of simple and effective means for stripping the container from its conveyor after the article has been inserted within the container.

These and other objects will be apparent from the following description, the appended claims, and the accompanying drawings which illustrate a selected embodiment of the invention and in which:

Fig. 1 is a plan view of a machine constructed in accordance with the present invention;

Fig. 2 is a front elevational view of the machine shown in Fig. 1;

Fig. 3 is a sectional view taken on the line 3—3 of Fig. 2;

Fig. 4 is an enlarged detailed section taken on the line 4—4 of Fig. 1;

Fig. 5 is a perspective view illustrating one form of container or box suitable for use with the machine illustrated;

Fig. 6 is a perspective view illustrating one form of an article adapted to be operated upon by the illustrated machine;

Fig. 7 is an enlarged perspective view of the transfer mechanism with certain of the parts omitted;

Fig. 8 is an enlarged detailed section showing a portion of the container carrying conveyor; and Fig. 9 is a detailed section taken on the line 9—9 of Fig. 8.

Referring to the drawings, the reference numeral 10 designates a vertical main frame which extends longitudinally of the machine and is mounted upon a suitable base member 11. The main frame 10 supports the various operating parts of the machine, and at its forward side carries a pair of conveyors 12 and 13, Figs. 1, 2 and 7. Both of the conveyors 12 and 13 move in the same direction, as indicated by the arrows in Fig. 1, and are arranged side by side in parallel relationship.

The conveyor 12 comprises an endless belt 14 which extends around a drum 15 providing for rotating the belt 14 at a predetermined speed. The drum 15 is mounted upon a shaft 16 which is suitably carried by the frame portion of the machine. A plate 17, supported upon a bar 18, extends along the length of the conveyor belt and provides a support for the upper reach of the conveyor.

A plate 19 extends upwardly from the plate 17 adjacent the forward side of the conveyor 12 and a second plate 20, Figs. 1 and 7, extends upwardly adjacent the rear side of the conveyor 12. The upwardly extending plates 19 and 20 provide guides for maintaining the articles 21 on the conveyor belt during movement by the conveyor.

The conveyor 13 comprises an endless chain having a plurality of elongated links 25 pivotally connected together by shorter links 26, Figs. 2 and 8. Each of the elongated links 25 carries a pair of spaced upstanding arms 27 forming a substantially U-shaped container receiving pocket or recess 28. The chain conveyor 13 is carried by sprockets 29 mounted upon shafts 30 which are carried by suitable bearings supported upon the machine frame. The containers 31 are fed to the conveyor 13 either manually or automatically, at the left hand end of the machine illustrated in the drawings, and fit snugly within the pockets 28 of the conveyor.

In the illustrated embodiment the container 31, Fig. 5, comprises a body portion 35 having end flaps 36 and front and rear cover flaps 37 and 38. The container is fed to the conveyor 13 with the end flaps at the rear side 39 of the container folded down, as illustrated in Fig. 5, and with the other portions folded outwardly as also illustrated in this figure. A rear upstanding plate 40, Figs. 4 and 7, provides for guiding the container during movement upon the conveyor 13.

A forwardly extending plate or apron 45 is bolted to the main frame 10 adjacent the end of the article conveyor 12 and provides for rotatably supporting a mechanism for transferring the articles from the conveyor 12 into the containers 31 carried by the conveyor 13. This mechanism comprises a verticaly extending shaft 46 which is carried by a bearing lug 47, Figs. 3 and 7, integrally attached to the plate 45. A spider 48 comprising four outwardly extending arms 49, Figs. 1 and 7, is attached to the upper end of the shaft 46 for rotation therewith.

Each of the arms 49 of the spider 48 carries a pivotally mounted arm 50 which is pivoted to the spider as indicated at 51. The arm 50 comprises upper and lower arm portions 52 and 53, Fig. 7, which are integrally joined by a web 54 and are provided with a downwardly extending article engaging finger 55.

Each of the portions 52 of the arms 50 is provided with an off-set portion 56 upon which a roller 57 is rotatably mounted. A plate 58 which overhangs the transfer mechanism is carried by an upstanding bracket 59, Fig. 3, bolted to the outwardly extending table or apron portion 45 of the main frame, and this plate 58 carries a cam plate 60 which also overlies the transfer mechanism. The cam plate 60 is provided with a cam groove 61, Figs. 1 and 3, within which the rollers 57 operate.

The cam groove 61 is so shaped that rotation of the spider 48 causes the arms 50 and fingers 55 carried thereby to travel in predetermined paths. Thus, the arms and fingers assume an outwardly extending position 62, which is generally parallel with the sides of the conveyors 12 and 13 and the direction of movement thereof, as illustrated in Figs. 1 and 7, when the fingers 55 engage against a side of an article 21 advanced by the conveyor 12. Continued rotation of the spider 48 causes the fingers to move the article 21 towards the conveyor 13 and the container 31 in the direction indicated by the arrow 63 in Fig. 1. During this movement the shape of the cam groove 61 is such that the arms 50 and fingers 55 remain substantially parallel with the position 62 in which they engage the article, as illustrated by the arm position 64 in Fig. 1.

The cam groove 61 then provides for maintaining the transfer arms and fingers in substantial parallelism with the conveyor 13 until the conveyor 13 is cleared. Thereafter, the cam groove moves the transfer arms and fingers to the outwardly extending position 62 providing for again engaging an article on the conveyor 12. The article 21 is thus pushed into the container 31 as distinguished from a rotary or whipping action.

Thus, when the finger 55 once engages the article 21, there will be no relative movement between the finger and the article during the insertion of the article into the container.

During transfer from the conveyor 12 to the container 31, the article 21 is received upon a table plate 70, Figs. 4 and 7. The upper surface of the conveyor 12 is positioned slightly above the supporting surface of the container conveying pockets 28, and the transfer plate 70 is provided with a downwardly cut portion 71 which provides for moving the article 21 freely into the containers 31. The articles 21 are thus advanced across the upper surface 72 of the transfer plate 70 and pass freely upon the bottoms 73 of the container, Fig. 4, which are received upon the downwardly cut portion 71 of the transfer plate.

A means is provided for assuring that the front cover flaps 37 are raised to an open position during insertion of the article 21. This means comprises a cam plate 75 which has a forward portion 76 that is attached to the guide plate 20. The cam plate 75 extends rearwardly towards the body portion 35 of the container, as illustrated at 77 in Fig. 1, and is also provided with an upwardly inclined cam surface 78, as shown in Figs. 2 and 7 of the drawings. The cam surface 78 engages the forwardly extending cover flap 37 of the container 31 and provides for positively moving this flap to an upward position, as indicated in Figs. 4 and 7, during insertion of the article 21.

The cam plate 75 is provided with an opening 80 through which the article 21 is inserted into the container 31. This opening extends above the outwardly extending end flaps 36 of the container 31 as clearly illustrated in Fig. 7.

After the article is inserted within the container 31, the front and rear ends of the container are closed by any suitable means, not shown, which may be located at the broken portion, Figs. 1 and 2, of the article conveyor. As the closed package together with the article received therein approaches the end of the conveyor 13, a means is provided for stripping the package or container from the conveyor. This means comprises angle members 85 and 86 which are attached to a table or apron portion 87, Figs. 2 and 3, and extend upwardly adjacent opposite sides of the conveyor 13. Each of the angle members 85 and 86 carries a bar or track 88 which engages under the container 31 and strips it from the conveyor chain 13 upon movement of the chain about the right hand sprocket 29. The upwardly extending lugs 27 of the pockets 28 in the container conveyor chain cause the container with the article enclosed therein to advance along the bars or tracks 88 as the chain passes around the sprocket 29.

The apparatus as thus described is driven by a shaft 90, Figs. 1 and 2, which extends longitudinally of the machine and is adapted to be driven by any suitable source of power (not shown). The shaft 90 is rotatably supported upon the machine frame by suitable means such as the bracket 91 and bearing 92, Fig. 1, and carries a pair of bevel gears 93 and 104. The bevel gear 93 meshes with the bevel gear 94, Figs. 2 and 3, rotatably mounted on a stud 95 rigidly supported on the frame member 10 by a boss 96. The bevel gear 94 carries a pinion 97 which meshes with an idler gear 98 also rotatably mounted upon the frame 10. The idler 98 carries a pinion 99 which meshes with a gear 100 fastened to the shaft 30 of the right hand sprocket 29 of the conveyor 13. The conveyor 13 is thus driven at a predetermined speed in accordance with the speed of the main drive shaft 90.

The bevel gear 104 meshes with a bevel gear 105 carried by a shaft 106. The shaft 106 carries a pinion 107 which meshes with an idler gear 108. The idler gear 108 is carried by a stub shaft 109 to which a pinion 110 is attached.

The pinion 110 meshes with a gear 111 mounted upon a shaft 112.

The shaft 112 extends transversely of the machine and is provided with a bevel gear 113 having meshing engagement with a bevel gear 114 attached to the vertically extending shaft 46 carrying the transfer spider 48 and transfer arms 50. The shaft 112 also carries a gear 115 which meshes with a gear 116 attached to the shaft 16 of the driving drum 15 for the conveyor 12.

The conveyor belt 14, the transfer arms 50 and the conveyor chain 13 are thus driven in coordinated timed relationship to provide for receiving articles 21 within the transfer arms 50 and fingers 55, transferring the articles to the container carrying conveyor 13, and inserting the articles within containers carried by the conveyor 13, all of said operations taking place continuously and simultaneously.

Changes may be made in the form, construction, and arrangement of the parts without departing from the spirit of the invention or sacrificing any of its advantages, and the right is hereby reserved to make all such changes as fairly fall within the scope of the following claim.

The invention is hereby claimed as follows:

An apparatus for feeding articles into containers and the like and comprising an article feeding conveyor, means for moving the article feeding conveyor continuously, a container feeding conveyor parallel to the article feeding conveyor, means for moving the container feeding conveyor continuously at a speed correlated with the speed of the article feeding conveyor, and means for engaging articles on the article feeding conveyor and inserting the articles into containers on the container feeding conveyor, said last named means including a continuously rotating spider member, means for rotating the spider member continuously in one direction at a speed correlated with the speed of the said conveyors, a plurality of arms pivotally mounted on said spider member, and guide means co-operating with the arms to shift the arms on their pivots, said guide means and arms being constructed and arranged to maintain parallelism of said arms with said conveyors from article engaging position to article inserting position.

CLARENCE J. MALHIOT.

REFERENCES CITED

The following references are of record in the file of this patent:

UNITED STATES PATENTS

| Number | Name | Date |
|---|---|---|
| 1,096,310 | Martin | May 12, 1914 |
| 1,235,312 | Hodert | July 31, 1917 |
| 1,330,596 | Loweree et al. | Feb. 10, 1920 |
| 1,502,201 | Jaeger | July 22, 1924 |
| 1,578,505 | Fetzer | Mar. 30, 1926 |
| 1,689,247 | Lange | Oct. 30, 1928 |
| 1,820,562 | Guenther | Aug. 25, 1931 |
| 1,873,059 | Smith et al. | Aug. 23, 1932 |
| 1,935,269 | Jones | Nov. 14, 1933 |
| 2,133,248 | Jones | Oct. 11, 1938 |
| 2,180,966 | Salfisberg | Nov. 21, 1939 |
| 2,285,283 | Jones | June 2, 1942 |